Figure 1:
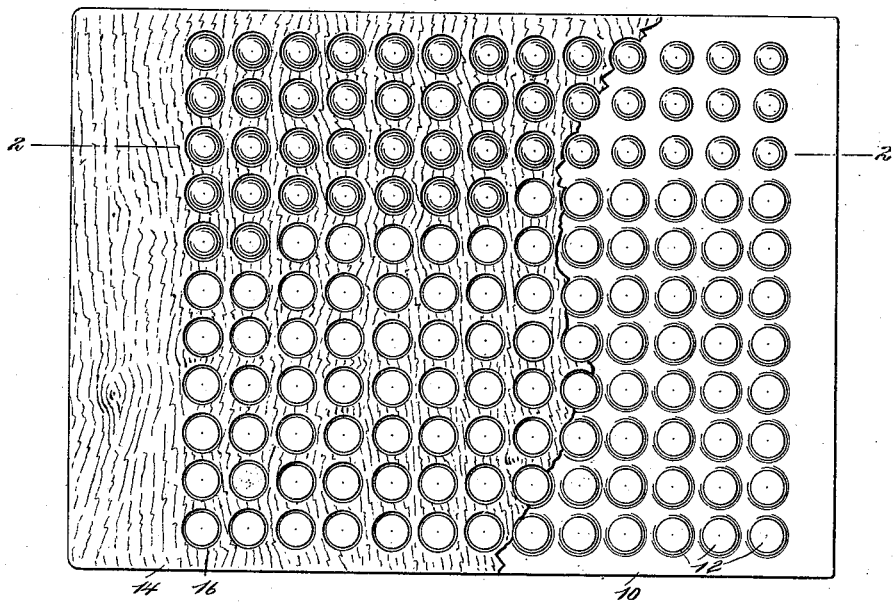

(No Model.) 2 Sheets—Sheet 1.

C. GOUSSET.
APPARATUS FOR FILLING CHOCOLATE DIPPERS.

No. 546,525. Patented Sept. 17, 1895.

WITNESSES:
William Goebel
H. B. Hutchinson

INVENTOR
C. Gousset
BY
[signature]
ATTORNEYS.

(No Model.) 2 Sheets—Sheet 2.
C. GOUSSET.
APPARATUS FOR FILLING CHOCOLATE DIPPERS.
No. 546,525. Patented Sept. 17, 1895.
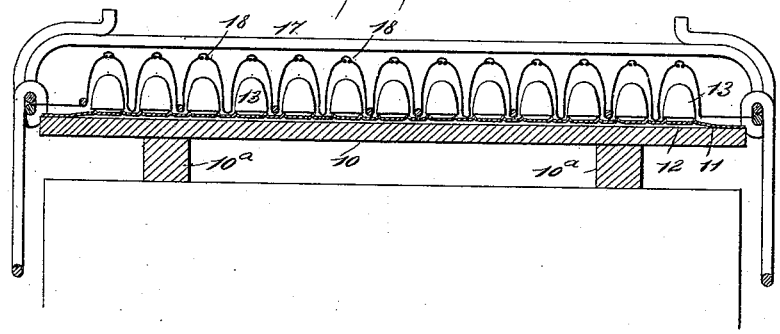
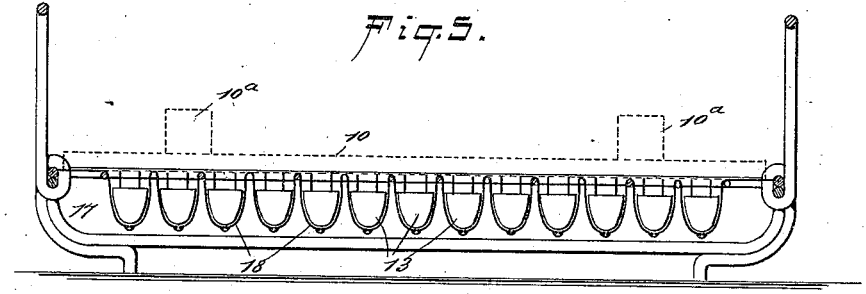
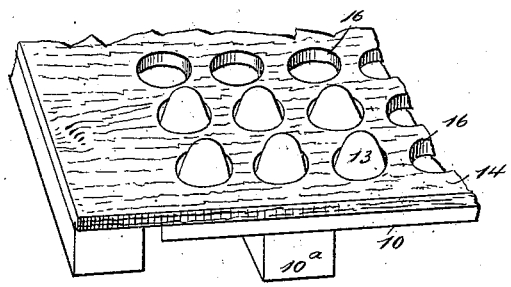 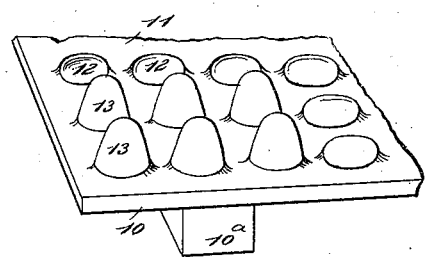
WITNESSES:
William Goebel
W. P. Hutchinson
INVENTOR
C. Gousset
BY
ATTORNEYS.

UNITED STATES PATENT OFFICE.

CYPRIEN GOUSSET, OF NEW YORK, N. Y.

APPARATUS FOR FILLING CHOCOLATE-DIPPERS.

SPECIFICATION forming part of Letters Patent No. 546,525, dated September 17, 1895.

Application filed October 5, 1894. Serial No. 524,970. (No model.)

*To all whom it may concern:*

Be it known that I, CYPRIEN GOUSSET, of New York city, in the county and State of New York, have invented certain new and useful Improvements in Filling Chocolate-Dippers, of which the following is a full, clear, and exact description.

My invention relates to an improved method of and apparatus for manufacturing chocolate-cream drops and filling suitable dippers adapted to immerse the cream drops for the purpose of coating the same with chocolate, in large quantities, which method and apparatus are adapted to be used with the device for dipping chocolate-cream drops for which Letters Patent of the United States No. 526,968 were granted to me on the 2d day of October, 1894. Prior to my said invention it was usual to coat cream drops with chocolate by hand by immersing them in the chocolate solution, generally one by one, and many attempts have been made to devise means by which such chocolate coating could be applied to large quantities of cream drops at one operation, but no satisfactory results have been obtained. In immersing the chocolate-dipper with the creams into the solution it is desirable to fill the pockets of the dipper rapidly with the creams, in order that the solution remaining on the wires may not have time to harden between the operations of dipping, for if the solution on the wires is allowed to harden while the cream drops are being placed in the pockets of the dipper they will stick to the wires of the pocket, rendering the operation unsatisfactory, as the creams will be imperfectly coated and will have to be pressed out of the pockets with sufficient force to break or scratch off the coating. For this reason it was found that by the method of holding the dipper in its ordinary position for placing the cream drops—that is, with the pocket-openings upward—and placing the cream drops in the pockets by hand, the cream drops could not be placed in position with sufficient rapidity to carry on the work in a satisfactory manner.

The object of my invention is to provide a very simple and rapid means of filling dippers of the kind named with cream drops, and also to produce a very simple apparatus, which is inexpensive, easy to handle and keep clean, and adapted for use in filling the dippers.

To these ends my invention consists of an improved apparatus for use in filling chocolate-dippers, which will be hereinafter described and claimed.

Reference is to be had to the accompanying drawings, forming a part of this specification, in which similar figures of reference indicate corresponding parts in all the views.

Figure 2:
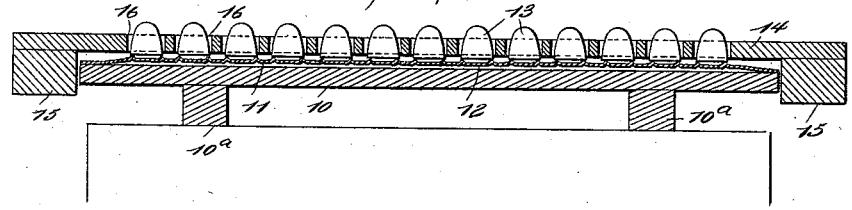
Figure 3:
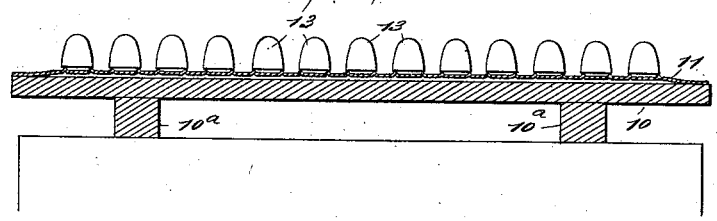

Figure 1 is a broken plan view of the table and guide-board for use in filling the dipper, the guide-board being partly broken away to show the table. Fig. 2 is a longitudinal vertical section on the line 2 2 of Fig. 1. Fig. 3 is a similar section with the guide-board removed. Fig. 4 is a longitudinal section of the dipper, as first applied to the table when the latter is loaded with cream. Fig. 5 shows the position of the dipper and creams after the table has been inverted, the table being in this case indicated by dotted lines. Fig. 6 is a broken enlarged perspective view of the table and guide-board, and Fig. 7 is a broken enlarged perspective view of the table.

In carrying out my invention I provide means whereby the cream drops may be so placed that a number sufficiently large to fill the pockets of the dipper will be placed in such position as to be rapidly and simultaneously inserted (one in each pocket of the dipper) so far into the pockets of the dipper that they touch or about touch the support provided for the point of the cream drop, and so that the cream drops cannot turn in the pockets in the further operation, and thereby the sides of the pockets or any of them become clogged with cream drops. For this purpose a table 10 is provided, which is supplied with projections, each projection corresponding to the position which each cream drop should occupy so as to enter the pockets of the dipping device. This table may be perfectly flat, but is preferably provided with a metal top 11, having a series of projections 12 thereon, these being each of a size to support an ordinary cream drop 13, as the drawings show. The rims or outer edges of these projections are, furthermore, slightly elevated, so that the center is concave, which allows for irregularities on the bottom of the cream drops that are sometimes formed by air-bubbles, &c., and these projections 12 should be so far elevated above the surface of the table 10 that the points or smaller ends of the cream-drops placed upon them will in the further operation pass far enough into their respective pockets to touch or nearly touch the support provided therein for such points or smaller ends. For this reason, when large drops are to be coated, I have found that a slight elevation of the projections above the surface of the table will answer very well, but with a smaller cream drop a considerable elevation of the projections is desirable to produce the best results. The elevations which I have found most satisfactory vary from something less than one-sixteenth of an inch to about three-sixteenths of an inch. It is desirable to place the cream drops rapidly in position on this table 10, and in order to do that I have devised a guide-board 14, which has holes 16, that tally with the projections and are slightly larger than the cream drops on the lower side of the guide-board 16—that is, the side nearest the projections when the guide-board is laid on the table 10—but are somewhat enlarged, flaring on the other or upper side to permit the cream drops to fall into these holes 16 more readily. This guide-board being placed upon the table 10, the operator spreads a large number of cream drops upon the same, rolling them over the board by hand, when the tendency of the cream drops is to drop into these holes 16, generally the larger and heavy end falling into a hole and upon its corresponding projection, and by slightly raising the guide-board many of the cream drops are thereby at once worked into their proper position. The operator then turns any of them which have not assumed the proper position and fills up the holes in which no cream drops have entered while rolling the mass over the board. When the holes 16 are all filled, the guide-board is lifted off the table, thus leaving the creams resting thereon, as shown in Fig. 3. The table is then ready for use in filling the dipper 17, which will not be described in detail, as it forms no part of this invention; but it is provided with a series of pockets 18, having open sides and adapted to receive the creams, there being as many pockets as there are facets on the table. To fill the dipper 17, it is placed bottom side up on the table 10, so that the pockets 18 close over the creams 13, as shown clearly in Fig. 4, and there will then be a cream in each pocket touching or nearly touching the pocket at the point of the cream drop. The dipper and table are then lifted together and the dipper turned right side up, leaving the table resting bottom side up on the pockets, and the table is then raised from the dipper, leaving the creams in the pockets, as shown in Fig. 5.

In order that the table may be easily lifted off, it is provided on its under side with cleats $10^a$ or equivalent devices, which serve also to support the table when it is right side up. It will be seen that by using the table and its guide-board a series of tables may be loaded up and that the operator who dips the creams may apply his dipper to one loaded table, fill the pockets, dip the creams, and then quickly fill the pockets again, so that the solution of chocolate has no time to cool on the wires, and a very nice job is done and the work is greatly expedited. It will of course be understood that the table and guide-board may be varied in shape and construction without departing from the principle of my invention, that the guide-board may be even dispensed with, and that the apparatus may be used in connection with any kind of a chocolate-dipper having pockets or equivalent receptacles to receive the creams.

Having thus described my invention, I claim as new and desire to secure by Letters Patent—

The apparatus for filling chocolate dippers with cream drops, consisting of a suitable table, 10, provided with a series of projections, each projection adapted to support a cream drop in position to pass the same into a pocket tallying therewith in such chocolate dipper, in combination with a perforated guide-board, 14, adapted to cause the cream drops to take position upon such projections, substantially as described and shown.

CYPRIEN GOUSSET.

Witnesses:
CHARLES H. DARROW, Jr.,
JOHN KEERILE.